(No Model.)  5 Sheets—Sheet 1.
E. F. STECK.
HOOK AND LADDER TRUCK.
No. 307,816.  Patented Nov. 11, 1884.
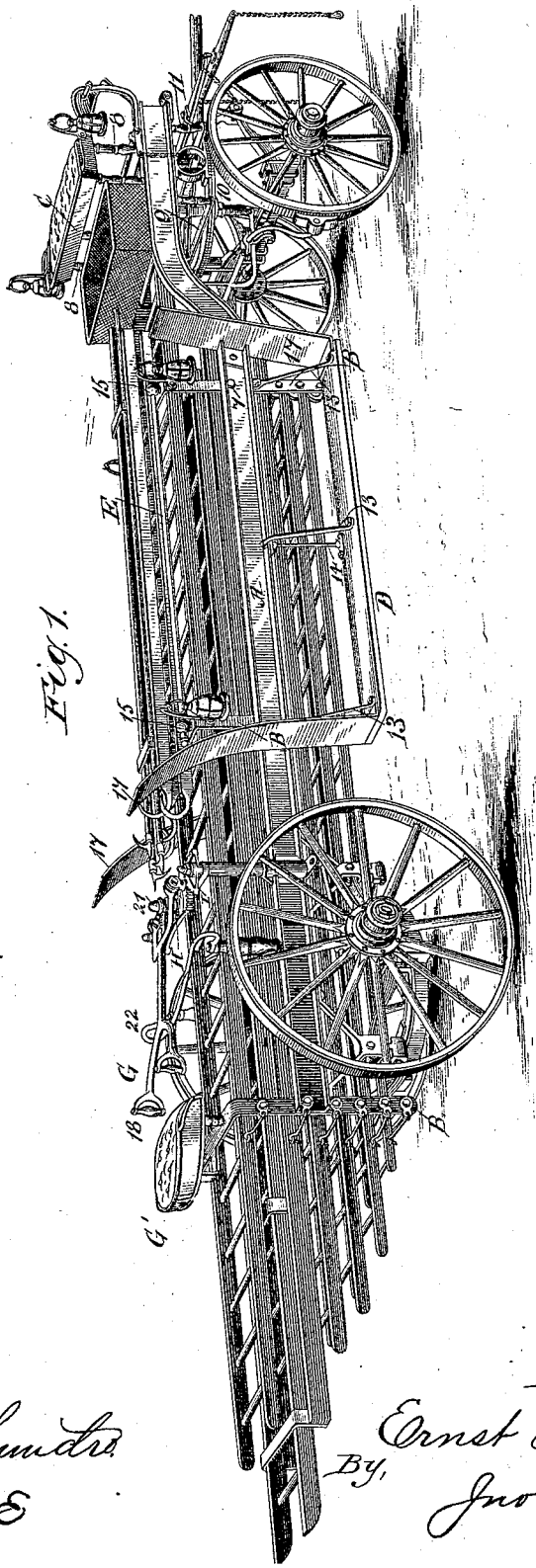
Witnesses.  
Will P. Omohundro  
Chas. G. Page
Inventor  
Ernst F. Steck  
By, Jno. G. Elliott  
Atty.

(No Model.) 5 Sheets—Sheet 2.
E. F. STECK.
HOOK AND LADDER TRUCK.
No. 307,816. Patented Nov. 11, 1884.
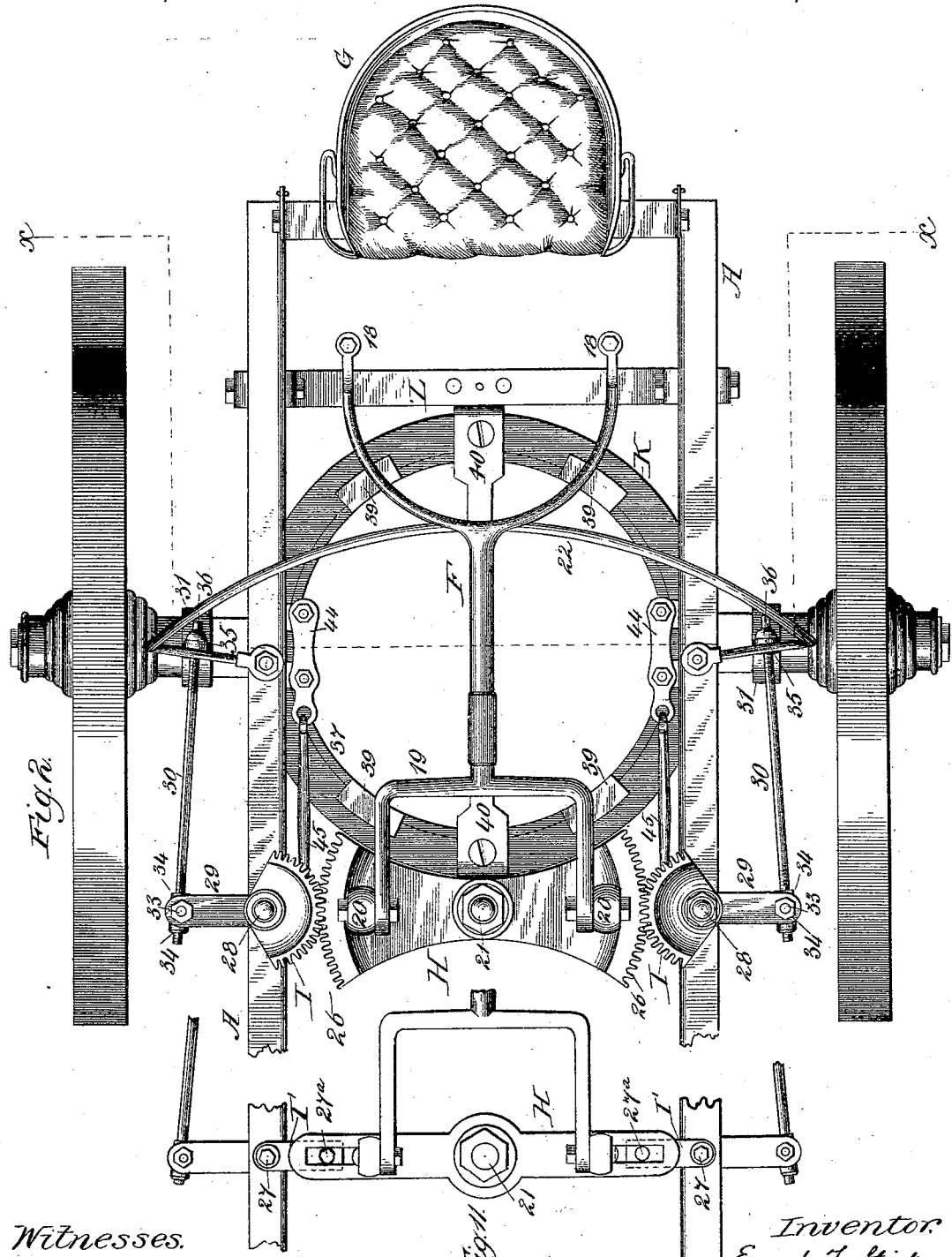
Witnesses.
Will R. Onohundro.
Chas G. Page.
Inventor.
Ernst F. Steck
By Jno. G. Elliott
Atty.

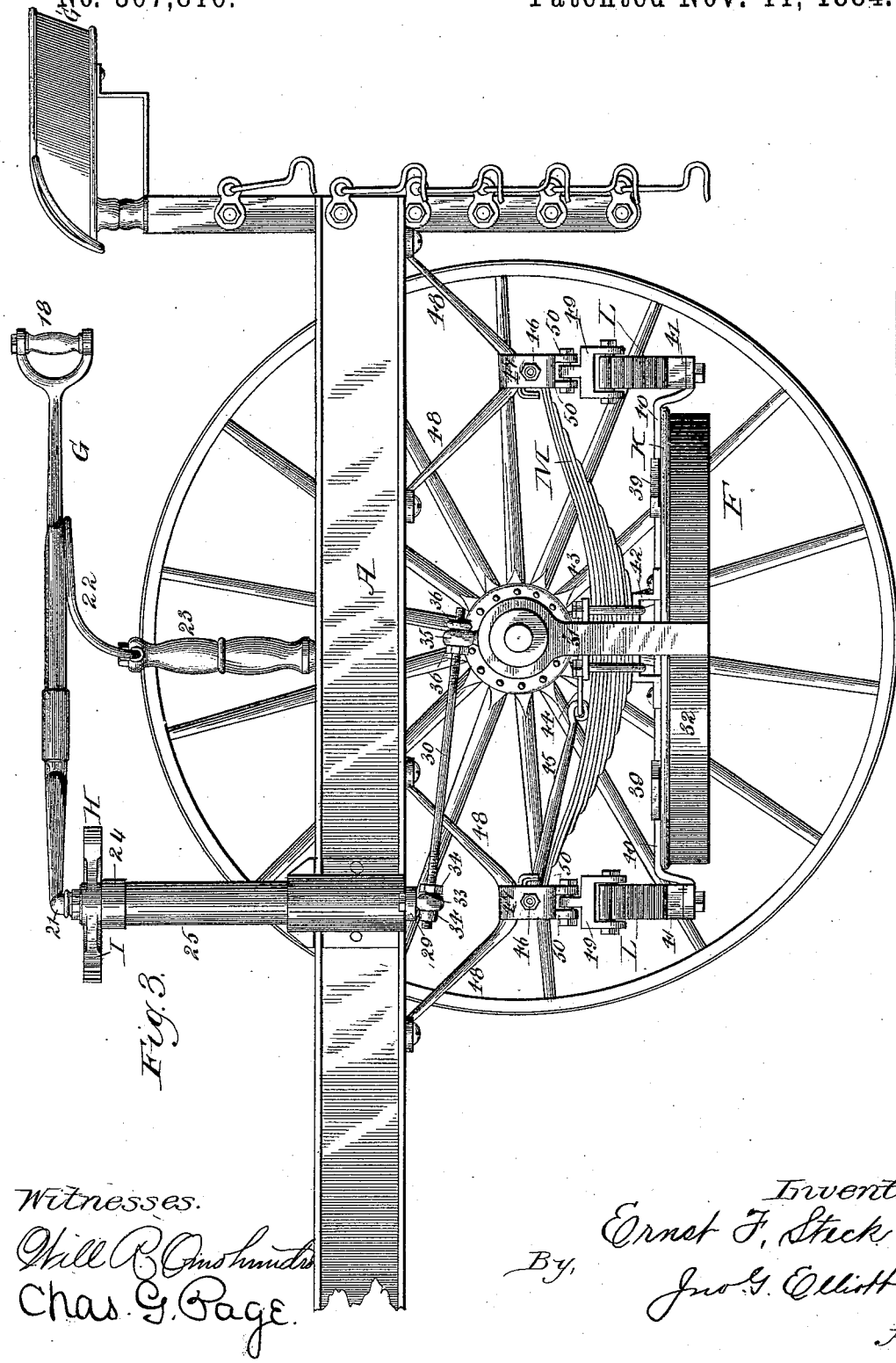

(No Model.) 5 Sheets—Sheet 4.
E. F. STECK.
HOOK AND LADDER TRUCK.
No. 307,816. Patented Nov. 11, 1884.
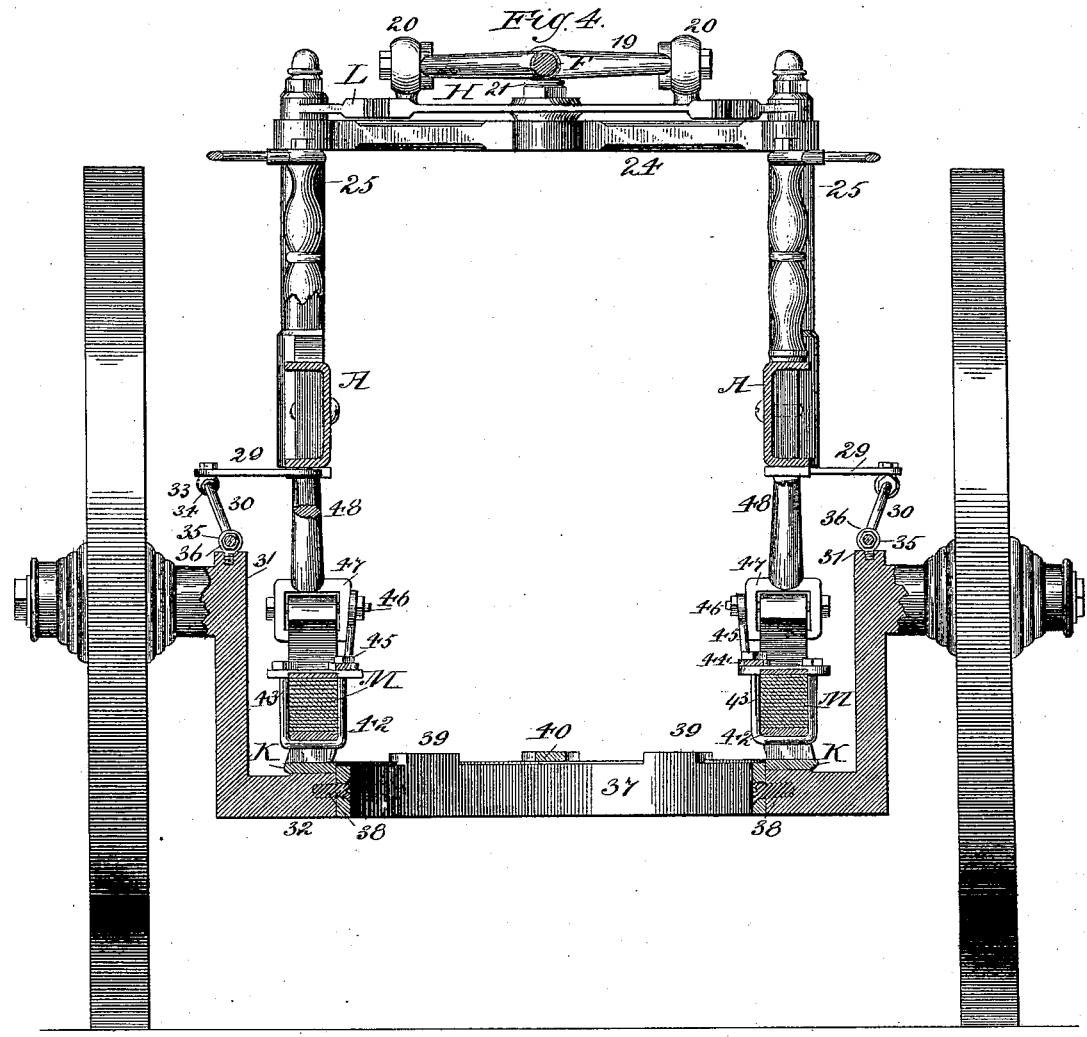
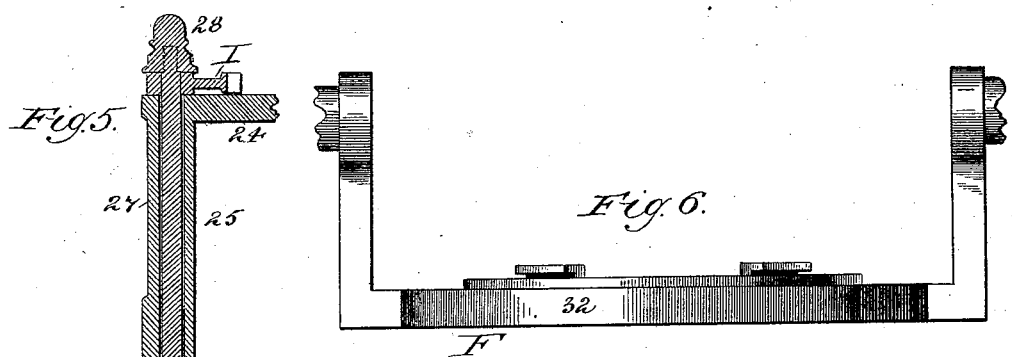
Witnesses:
Inventor
Ernst F Steck
By, Jno. G. Elliott
Atty.

(No Model.) 5 Sheets—Sheet 5.
E. F. STECK.
HOOK AND LADDER TRUCK.
No. 307,816. Patented Nov. 11, 1884.
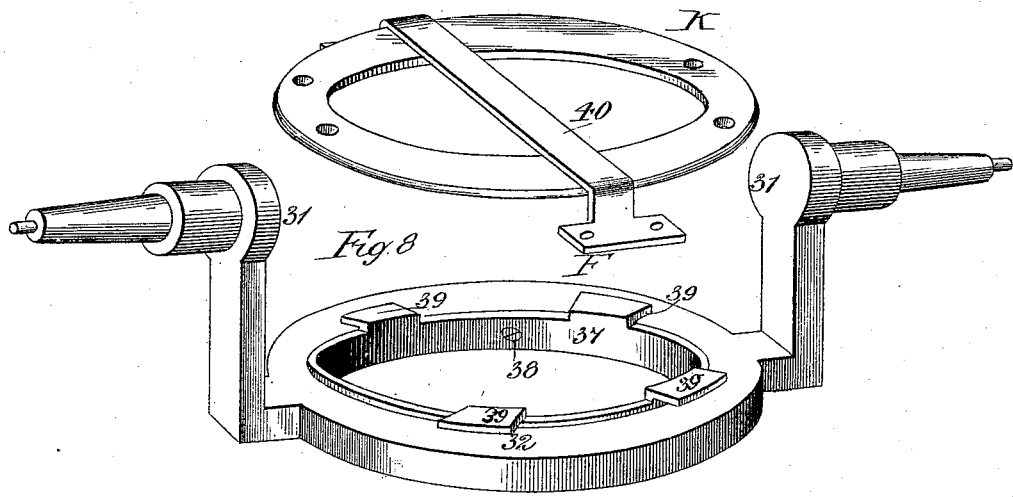
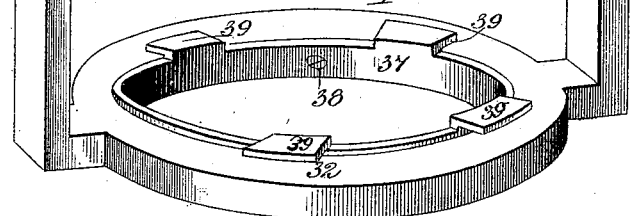
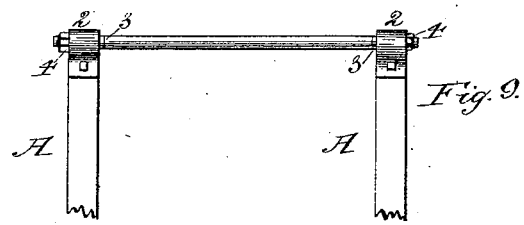
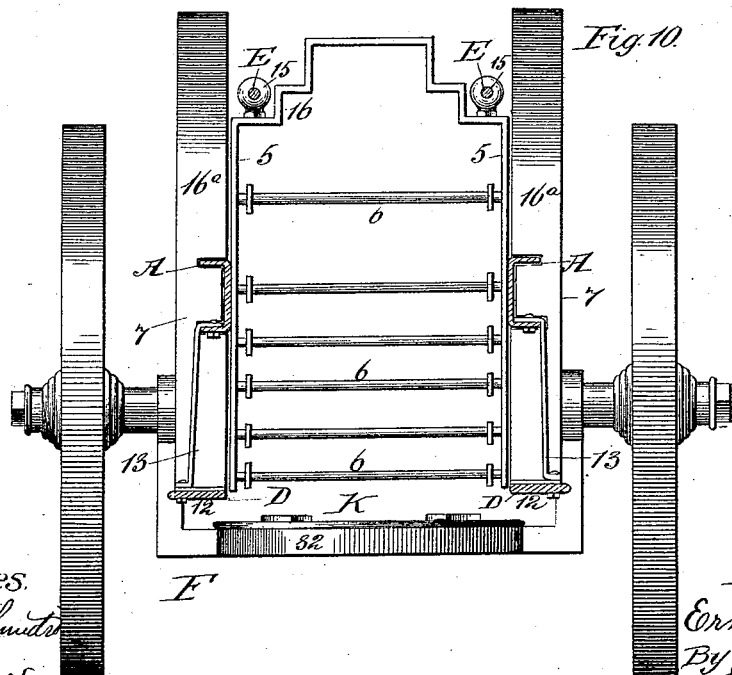
Witnesses. Inventor.

UNITED STATES PATENT OFFICE.

ERNST F. STECK, OF CHICAGO, ILLINOIS.

HOOK-AND-LADDER TRUCK.

SPECIFICATION forming part of Letters Patent No. 307,816, dated November 11, 1884.

Application filed August 22, 1884. (No model.)

*To all whom it may concern:*

Be it known that I, ERNST F. STECK, a citizen of the United States, residing in Chicago, county of Cook and State of Illinois, have invented certain new and useful Improvements in Hook-and-Ladder Trucks, of which the following is a specification.

In hook-and-ladder trucks as heretofore constructed the truck is steered by means of a hand-wheel connected by gearing or like connecting mechanism with the rear axle, which latter is arranged to turn about a pivot at its middle. In trucks of such character the rear pivoted axle has been made straight, and, as the wheels on which said axle is mounted are necessarily high, the body of the truck supported over the straight axle by the usual intermediate springs will, as a result of such an arrangement, act at a considerable height above the ground, thereby rendering the vehicle top-heavy.

One object of my invention is to decrease the height at which the main body portion of the truck is set above the ground without restricting the capacity of the truck for supporting hooks and ladders. To such end I support the rear springs from a double cranked or bent axle having its middle portion adapted to form a low-down annular bearing for a sort of rear fifth-wheel, which is provided with seats and means for supporting and holding the rear springs. A further object is to provide a simple, certain, and efficient steering mechanism by which the rear axle can be instantly swung either way, and the movement of the body of the truck readily and effectively controlled. Further objects are to provide an arrangement of low-down step or platform at either or both sides of the truck, and a hand-rail for each step running over the truck, in a line between the side and middle line of the truck, so that an attendant standing on the step shall not be compelled to hang on and incline his body outwardly and away from the side of the truck; to lighten the truck-frame and at the same time to render it strong and durable without the necessity of a multiplicity of stays or brace-rods, and to provide certain improved details of construction, all as hereinafter fully described and illustrated in the annexed drawings, in which—

Figure 1 is a perspective view of a hook-and-ladder truck embodying my invention. Fig. 2 is a top plan view of the rear end portion of the same, with the hooks and ladders removed; and Fig. 3 is a side elevation of the same. Fig. 4 is a transverse section looking toward the forward end of the truck and taken in a vertical plane indicated by the line $x\ x$, Fig. 2. Fig. 5 is a vertical central section through one of the hollow posts 25 and the rock-shaft or spindle passing through the same. Fig. 6 is an elevation of the middle portion of the rear bent axle. Fig. 7 represents in perspective the ring-plate K separate from the rear axle. Fig. 8 is a perspective of the rear axle. Fig. 9 is a detail showing a transverse brace or tie rod provided for connecting together the front ends of the sills or sides of the truck-frame. Fig. 10 is a transverse section taken on a vertical plane through the middle of the truck. Fig. 11 shows a modification of the double sector-rack segment, sector-gears employed in the steering apparatus.

One of the main features of the frame of the truck consists of a pair of longitudinal side bars or sills, A, each running continuously from end to end of the truck, and each formed of a single length of channel-iron. These side bars or sills are necessarily of a considerable length, owing to the length required for a hook-and-ladder truck, and hence, while it is desirable to provide a strong inflexible frame for the latter, it is extremely desirable to avoid excessive weight and a multiplicity of brace-rods, which also add to the weight of the structure. The sills thus formed of channel-iron, while being comparatively light, are at the same time strong and inflexible, and require so little bracing that the rack-frames for the ladders, supplemented by connections mainly provided at the forward end of the truck for the seat and the bearing for the fifth-wheel, constitute, essentially, all required connections between the sills A. The sills are connected together at the rear end of the truck by one of a set of ladder-racks, B, and at their front ends are connected together by a cross-rod, 1, Fig. 9, which is fitted at its ends in bearings, 2, secured to the ends of the sill. This rod is provided with shoulders 3, against which the bearing-pieces 2 are held by means of nuts 4, fitted upon screw-threaded end portions of the rod and tightened up against the bearing-pieces. The ladder-rack frames B, which are arranged at intervals between the sills A, each consist of a rectangular arch, Fig. 10, the vertical sides 5 of which are bolted to the inner plane sides of the sills, and afford bearings for a set of horizontal cross-rods, 6, constituting the rack or supports for the ladders. One of these ladder-supporting rods 6 of each set passes through the sides of an arch, also passes at its ends through the sills, and is provided with nuts 7, tightened up against the outer sides of the sills, in which way the said rods also subserve the functions of the brace-rod, hereinbefore described, at the front end of the frame. In this way the sills composed of channel-iron, with the flanges thereof at the outer side of the frame, will be connected together and effectively braced, and at the same time a construction involved which admits of the frame being readily put together. The structure is still, however, further braced and strengthened by devices which are designed for other necessary ends—as, for example, by the driver's seat C, arranged on hollow posts 8, rising from the upper flanged edge portions of the sills, the seat-posts and upper flanged edge portions of the sills being in such case bolted together by means of bolts or tie-rods passing through the hollow posts. The frame 9, providing a bearing for the king-bolt, and formed with or secured to a flat ring, which rests upon the fifth-wheel 10, also serves as an auxiliary brace, since said frame is bolted to the lower flanged edge portions of the sills by means of bolts or tie-rods passing through hollow posts 11, arranged between the frame and the sills. And, in addition to these said devices, a cross-bar, upon which the gears belonging to the steering apparatus are mounted, as hereinafter described, also aids in strengthening the structure. The sides of the arch-frames of the ladder-racks are at their lower ends bent outwardly from the sides of the frame and at right angles thereto, as at 12, so as to afford supports for a long middle step or platform, D, at each side of the truck. These steps or platforms D each run longitudinally with the length of the truck, and are sufficiently low down to render it an easy matter for attendants to step on and off the same. The steps or platforms are bolted to the lower horizontal end portions of the sides of said frames, and are also further supported and braced by means of the inclined braces 13, connecting the end portions of the steps with the vertical sides of the frame, and the middle portions of the steps with the lower flanged edge of the sills. These braces are provided at their ends with suitable eyes for the fastening-bolts, and can at the ends of the step be secured by the bolts employed for securing the step to the lower ends of the frame. As an additional support for the middle portion of the steps, I provide for each a vertical support, 14, having T-shaped ends, respectively, bolted to the step and to the lower flanged edge portion of a sill. These steps stand out from the planes of the sides of the truck-frame, so that the attendants can stand in an upright position on the steps, and, as a means for enabling the attendants to hold on to the truck so as to preserve their footing, I provide a pair of elevated longitudinally-arranged hand-rods, E, extending from one to the other of the two forward ladder-rack frames, and supported at their ends by bearing-knobs 15, which are secured on the cross or arch portions 16 of the said frames. It will be seen that by such arrangement the horizontal hand-rods are supported at points which are above the sides of the truck-frame and nearer the middle line of the frame, which arrangement obviates the necessity of an attendant leaning out from the side of the truck while standing on the steps, as heretofore in trucks of this character provided with side steps, whereby his position will be more comfortable and footing and hold on the truck-frame rendered more secure, since the inclination of his body can be somewhat toward instead of away from the truck-frame, and his arm extended over the same and toward the middle line thereof. At each end of each step is a curved or inclined guard, 17, serving to protect the attendants on the steps from mud thrown from the wheels. The ladder-rack frames are provided with suitable lantern-supports, and the rack-bars 6 of such frames will be provided with suitable rollers or loose sleeves for the ladders to rest upon, the end rack-frame being also provided with hooks for engaging in eyes on the ends of the ladders. The rear wheels are arranged on the outer horizontal end or spindle portion of a cranked or bent axle, F, of which the middle portion is in the nature of a low-down fifth-wheel arranged below the rear springs of the truck, in which way the truck-frame can be set much lower than if the springs were arranged between the frame and a straight axle, and hence the sills forming the main and essential portion of the body-frame of the truck can run at a comparatively low distance above the ground from their rear ends to the points where they take an upward curve, in order to provide for an elevated driver's seat and the usual running-gear below the frame or body at the front end of the truck. The steering-lever G for the rear wheels is arranged within convenient reach of a seat, G', which is supported upon the rear ladder-rack frame. The steering-lever is provided at its rear end with a pair of handles, 18, and is at its forward end provided with a yoke, 19, having its ends pivoted to a pair of knobs or bearings, 20, which are formed upon or secured to the top side of a horizontal double sector-gear, H. The lever serves as a means for oscillating the double segment-gear about a central pivot, 21, for the latter, and is susceptible of being raised or swung up by the operator to such height as may be found most convenient for operating the same. In a state of rest the steering-lever lies in a substantially horizontal position, in which it is upheld by a rest, 22, consisting of a bent rod extending transversely across the frame at a point in front of the rear seat, and secured at its ends upon standards 23, rising from the side bars of the main frame. The double segment-gear H is arranged to oscillate in a horizontal plane, and is mounted to turn about a pivot, 21, rising from the middle portion of a horizontal cross-bar, 24. This cross-bar is arranged transversely to the length of the machine, and is supported at its ends upon a pair of hollow posts, 25, (see Fig. 5,) which are secured at their base portions to the longitudinal sills A of the truck-frame. The double segment-gear H is provided with a gear, 26, at each end, which said gears engage a pair of oscillatory sector-gears, I, secured upon the upper end portions of long pivots or rock-shafts 27, which extend through the hollow posts 25 and project above and below the ends of the said hollow posts or bearings. These long pivots or rock-shafts each carry a nut, 28, fitted at its top end and tightened down on the sector-gear I. which is rigid on the said end of the pivot. The said pivots are also each provided at its lower end with a short horizontal arm, 29, arranged to vibrate at the side of the main frame. The arms 29 are respectively connected with the rear axle by means of rods 30, (see Fig. 2,) which have a swivel-connection at their forward ends with said arms, and at their rear ends a similar connection with the bent or cranked ends 31 of rear axle, which said ends of the axle are connected together by a ring, 32, constituting the middle portion of the rear axle. The connection between the connecting-rods 30 and the arms 29 is in each instance conveniently formed by a swivel, 33, on the outer end of the arm, and providing a bearing for the end of the rod, which has at such end a screw-threaded portion carrying a pair of nuts, 34, respectively fitted on the rod at opposite sides of the swivel. At their rear ends the rods each have a screw-threaded portion passing through a bearing formed by a swivel, 35, on the upper end of the cranked portion of the axle, and provided with a nut, 36, at each side of said swivel, in which way, by adjusting the nuts on the rods 30, the throw of the vibratory arms 29 can be varied by varying the length of rod between the swivels on the arms and the axle. The short cranked portions of the axle are provided at their upper ends with the usual straight spindles for the wheel-hubs, which said spindles will be but a little lower than the longitudinal side bars of the main frame. These cranked portions of the axles extend at their lower ends below the set of springs employed for supporting the rear end of the truck-frame or body. The ring 32, constituting the middle portion of the rear axle, is arranged to turn against the under side of a ring or annular bearing-piece, K, which is supported on the annular middle portion of the axle. The set of springs are supported from this flat ring K, as hereinafter described, and a connection between the flat ring or bearing-piece, K, is maintained by means of an annular band, 37, secured by bolts or screws 38 to the inner side of the annular middle portion of the axle, and provided with a set of lips, 39, which lap over the upper side of the annular bearing-piece K, which is connected with the frame. While holding said members in connection with each other the axle shall be free to swing either way. To the upper side of the fixed annular bearing-piece K is secured a horizontal bar, 40, running longitudinally with the length of the truck, and bent down at its ends at opposite sides of the middle portion, 32, of the axle, so as to provide seats for blocks 41, Fig. 3, on which the two transverse rear springs, L, are secured at their middle portions, said blocks being suitably bolted upon the ends of bar 40 by means of bolts, which also serve to hold the springs L seated upon the said blocks or seats. The annular bearing-pieces K also support a pair of bent straps or plates, 42, bolted to the said ring, and in turn forming seats for the rear longitudinal side springs, M, which are seated and secured on said plates by means of clips 43. These clips, consisting of staples passing at their ends through cross-plates, against which nuts on the ends of the staples are tightened up, are arranged in pairs, one pair for each spring, braced by cross-plates 44, one of which is fitted on a leg of each pair of staples or bent rods of the clips, which said plates are connected by brace-rods 45 with the bolts or pintles 46, preferably provided for the forward ends of the longitudinal rear side springs, which latter are at their ends supported by pins or pintles 46 in boxes or loops 47, suspended from the sills A of the truck-frame by V-shaped braces 48, formed with or rigidly secured to the said loops or boxes and bolted at their upper ends to the side bars of the main frame. These braces are each preferably made of a single rod bent into an approximately V shape and uniting with a box or loop, 47, at its angle, the upper ends of said bent rods being provided with eyes and bolted to the under side of the sill A. The ends of the transverse rear springs, L, are supported from the loops 47 by means of hangers or clips 49, Fig. 3, pivoted between lugs or ears 50 on the under side of the loops 47, and provided with bolts or pintles for the ends of the transverse springs. By means of such arrangement of connections between the springs and the frame, and between the springs and the bearing-piece, which is supported upon the middle portion of the axle, the latter has a free turning space, and the weight is equally distributed on springs arranged both transversely to and longitudinally with the length of the truck, the transverse spring being arranged in front and in rear of the axle, and the longitudinal springs being arranged to cross the axle at points beyond its middle.

It will be obvious that in place of the double sector-gear H, an oscillating lever, H′, slotted at each end and pivoted at its middle, as in Fig. 11, could be employed; and in place of the sector-gears I, arms I' could be secured to the upper ends of the pivots 27, and provided at their outer ends with studs 27ª, arranged to work in the slotted ends of the lever H', into which latter the steam-lever would be connected.

Having described my invention, what I claim, and desire to secure by Letters Patent, is—

1. A hook-and-ladder truck supported at its rear from the low-down middle portion of a bent swinging axle, substantially as described.

2. The combination, in a hook-and-ladder truck, of the truck-body supported at the rear from a downwardly-bent swinging axle, with a steering mechanism for swinging the said axle either way, substantially as described.

3. In a hook-and-ladder truck, the rear swinging axle, bent downwardly between its ends, and having its middle low-down portion constructed to constitute an annular seat or bearing, in combination with a steering mechanism and an annular base-support for the rear springs resting on said middle portion of the axle, so as to admit of a swinging movement on the part of the axle, substantially as described.

4. In a hook-and-ladder truck, the rear swinging axle, bent downwardly between the ends, and constructed to form a middle annular seat or bearing, in combination with an annular base-support for the rear springs resting on said annular seat or bearing portion of the axle, and a ring secured within and secured to the annular middle portion of the axle, and provided with lips extending over the base-support for the springs, whereby a movable connection is maintained between the support for the springs and the axle, substantially as described.

5. The combination, in a hook-and-ladder truck, of the rear swinging axle, with an oscillatory double sector-gear engaging a pair of oscillatory gears which are fixed upon their spindles, and connections, substantially as described, between said spindles and the swinging axle, whereby a turning movement on the part of the double sector-gear in either direction shall effect a like swinging movement on the part of the rear axle, substantially as described.

6. In a hook-and-ladder truck, the steering-lever, pivotally connected with an oscillatory double sector-gear, in combination with sector-gears operated by the double sector-gears, and a connecting mechanism between the sector-gears and the swinging axle, substantially as described.

7. In a hook-and-ladder truck, the rear swinging axle, bent down at a point between its ends, and provided at its middle with a seat for a base-support for the springs, in combination with the oscillatory double sector-gear engaging a pair of oscillatory gears rigid with their pivots, and connecting rods or links connecting the end portions of the swinging axle, with arms upon the pivots of the said pair of gears, substantially as described.

8. In a hook-and-ladder truck, the sector-gears secured upon pivots passing through hollow posts on the truck-frame, in combination with the oscillatory double sector-gears engaging the said sector-gears, and provided with an operating-lever, and connections between the axle and arms, secured upon the pivots of the sector-gears, substantially as described.

9. In a hook-and-ladder truck, the annular base-support for the rear springs seated upon a swinging axle, in combination with a set of rear side and cross springs, and connections by which the ends of the springs are connected with the truck-frame, and their middle portions connected with the annular base-support, substantially as described.

10. In a hook-and-ladder truck, the annular base-support for the rear springs seated upon a swinging axle, in combination with the rear cross-springs seated and secured upon the ends of a bar, 40, rigid with the annular base-support, substantially as described.

11. In a hook-and-ladder truck, the rear side springs seated and secured upon the supports 42, secured to the annular base-support K, resting upon the rear swinging axle, substantially as described.

12. In a hook-and-ladder truck, the rear side springs connected at their ends with the V-shaped pendants which are secured to the truck-body, in combination with the rear cross-springs connected at their ends by loops or hangers with the devices for connecting the rear side springs with the hangers, and a base-support common to all of said springs, and seated on a swinging axle arranged to turn independently of the base-support for the springs, substantially as described.

13. In a hook-and-ladder truck, the truck-frame having its sides or sills each composed of a bar of angle-iron, said sides being connected together to form the truck-body, substantially as described.

14. In a hook-and-ladder truck, the sides or sills composed of angle-iron, in combination with the ladder-truck frames secured between said sills, and each having one of its ladder-supporting bars serving as a means for connecting together and bracing the said sills, substantially as described.

15. In a hook-and-ladder truck, the swinging axle having an annular middle portion, in combination with the base-support K, the rear, side, and cross springs, the loops or clips 47 and 49, connecting together the ends of said springs, and the pendants by which the loops 47 are connected with the body-frame of the truck, substantially as described.

ERNST F. STECK.

Witnesses:
W. W. ELLIOTT,
CHAS. G. PAGE.